United States Patent
Ohmori

(10) Patent No.: US 8,663,845 B2
(45) Date of Patent: Mar. 4, 2014

(54) SECONDARY-BATTERY CURRENT COLLECTOR, SECONDARY-BATTERY CATHODE, SECONDARY-BATTERY ANODE, SECONDARY BATTERY AND PRODUCTION METHOD THEREOF

(75) Inventor: Masahiro Ohmori, Oyama (JP)

(73) Assignee: Showa Denko K.K., Tokyo (JP)

( * ) Notice: Subject to any disclaimer, the term of this patent is extended or adjusted under 35 U.S.C. 154(b) by 153 days.

(21) Appl. No.: 11/816,035

(22) PCT Filed: Feb. 10, 2006

(86) PCT No.: PCT/JP2006/302791
§ 371 (c)(1),
(2), (4) Date: Aug. 10, 2007

(87) PCT Pub. No.: WO2006/085691
PCT Pub. Date: Aug. 17, 2006

(65) Prior Publication Data
US 2009/0029255 A1    Jan. 29, 2009

Related U.S. Application Data

(60) Provisional application No. 60/653,529, filed on Feb. 17, 2005.

(30) Foreign Application Priority Data

Feb. 10, 2005 (JP) .................................. 2005-34639

(51) Int. Cl.
*H01M 4/13* (2010.01)
*H01M 2/16* (2006.01)
*H01M 4/58* (2010.01)
*B05D 5/12* (2006.01)

(52) U.S. Cl.
USPC ............... 429/231.1; 429/246; 429/231.3; 429/231.5; 429/231.8; 427/122; 427/77

(58) Field of Classification Search
None
See application file for complete search history.

(56) References Cited

U.S. PATENT DOCUMENTS

| | | | |
|---|---|---|---|
| 4,320,184 A * | 3/1982 | Bernstein et al. | 429/217 |
| 4,504,641 A | 3/1985 | Nochumson | |

(Continued)

FOREIGN PATENT DOCUMENTS

| | | |
|---|---|---|
| JP | 4 24831 | 4/1992 |
| JP | 7-201362 | 8/1995 |

(Continued)

OTHER PUBLICATIONS

Takaya Sato, "Characteristics of Ion-Conductive Cellulose Derivatives and its Application to Battery". The 13$^{th}$ Polymer Material Forum, Atsuta-ku, Nagoya; Nov. 11 & 12, 2004.

(Continued)

*Primary Examiner* — Bijay Saha
(74) *Attorney, Agent, or Firm* — Oblon, Spivak, McClelland, Maier & Neustadt, L.L.P.

(57) ABSTRACT

A secondary-battery current collector comprising an aluminum foil and a film containing an ion-permeable compound and carbon fine particles formed thereon or a secondary-battery current collector comprising an aluminum foil, a film containing an ion-permeable compound and carbon fine particles formed thereon as the lower layer, and a film containing a binder, carbon fine particles and a cathodic electroactive material formed thereon as the upper layer, a production method of the same, and a secondary battery having the current collector are provided.

8 Claims, 1 Drawing Sheet

(56) References Cited

U.S. PATENT DOCUMENTS

| | | | | |
|---|---|---|---|---|
| 4,834,772 | A | * | 5/1989 | Dixon et al. ............... 29/623.5 |
| 4,985,147 | A | * | 1/1991 | Mochizuki et al. ...... 210/500.27 |
| 6,804,108 | B2 | * | 10/2004 | Nanjundiah et al. .......... 361/502 |
| 7,078,132 | B2 | * | 7/2006 | Kim et al. .................... 429/331 |
| 2002/0122985 | A1 | * | 9/2002 | Sato et al. ................... 429/232 |
| 2003/0036000 | A1 | * | 2/2003 | Mori et al. ............... 429/231.95 |
| 2005/0186474 | A1 | * | 8/2005 | Jiang et al. .................. 429/209 |
| 2007/0109722 | A1 | | 5/2007 | Ohmori |

FOREIGN PATENT DOCUMENTS

| | | |
|---|---|---|
| JP | 7 288124 | 10/1995 |
| JP | 7 123053 | 12/1995 |
| JP | 08-273671 | 10/1996 |
| JP | 9 97602 | 4/1997 |
| JP | 9 97625 | 4/1997 |
| JP | 10-144298 | 5/1998 |
| JP | 11 297332 | 10/1999 |
| JP | 2001 266850 | 9/2001 |
| JP | 2001 307731 | 11/2001 |
| JP | 2001 313035 | 11/2001 |
| JP | 2002 352796 | 12/2002 |

OTHER PUBLICATIONS

Taiwanese Office Action issued May 7, 2012, in Patent Application No. 095104615.

U.S. Appl. No. 13/302,373, filed Nov. 22, 2011, Ohmori.

* cited by examiner

SECONDARY-BATTERY CURRENT COLLECTOR, SECONDARY-BATTERY CATHODE, SECONDARY-BATTERY ANODE, SECONDARY BATTERY AND PRODUCTION METHOD THEREOF This application claims priority to Japanese Patent Application No. 2005-34639 filed on Feb. 10, 2005 and U.S. Provisional Application Ser. No. 60/653,529 filed on Feb. 17, 2005, the entire disclosures of which are incorporated herein by reference in their entireties.

CROSS REFERENCE TO RELATED APPLICATIONS

This application is an application filed under 35 U.S.C. §111(a) claiming the benefit pursuant to 35 U.S.C.§119(e)(1) of the filing date of U.S. Provisional Application Ser. No. 60/653,529 filed on Feb. 17, 2005, pursuant to 35 U.S.C.§111(b).

TECHNICAL FIELD

The present invention relates to a lithium ion secondary-battery current collector, a secondary-battery cathode, a secondary-battery anode, a secondary battery and methods of producing the same, and also to a high-performance material giving a lithium-ion secondary battery superior in quick-recharge characteristics.

BACKGROUND ART

Lithium-ion secondary battery is a high-performance secondary battery and has been used in various applications such as cell-phone, notebook computer and camcorder because of its high energy density, and is expanding its market significantly. Lithium cobaltate or lithium manganate is generally used as the cathodic electroactive material and graphite as the anode in smaller lithium ion batteries among them. Such a lithium-ion battery also contains a separator of a porous sheet such as of polypropylene, polyethylene, or the like, and an electrolyte solution, for example, an organic solution containing a lithium salt such as an ethylene carbonate-based solution of lithium hexafluorophosphate (LiPF$_6$).

More specifically, the cathode of common lithium-ion secondary batteries is prepared by immobilizing a cathodic electroactive material such as lithium cobaltate or lithium manganate and electron-conductive carbon fine particles having a current-collecting effect for conveying electrons therefrom (thereto) on a metal foil. The metal foil used then is generally an aluminum foil, and, for example, polyvinylidene fluoride (PVDF) or polytetrafluoroethylene (PTFE) is used as the binder for immobilizing the cathodic electroactive material and carbon fine particles thereon.

Recently, there is an increasing trend toward application of such a high-performance secondary battery in the fields demanding power such as automobiles, which gave rise to problems not foreseen from conventional smaller batteries.

One of them is quick discharge/recharge characteristics. A greater amount of current is needed for generation of greater power. For that reason, a battery, which loses its capacity rapidly, should be recharged once again. Recharge of the battery should be shortened by using a greater current, because a longer recharge period results in elongation of the period when the battery cannot be used. The discharge and recharge characteristics at a greater current, jointly referred to as quick discharge/recharge characteristics, are an important indicator of secondary battery usefulness.

As described above, a greater current is indispensable for quick discharge and recharge. However, discharge and recharge of conventional lithium-ion secondary batteries at a greater current cause an inconvenience of drastic deterioration in capacity (retention rate of its initial battery capacity) when the discharge and recharge are repeated, i.e., deterioration in output power during repeated discharge and recharge at a greater current. More specifically, it is currently almost impossible to discharge and recharge a battery at 20 C (i.e., at a current 20 times greater than that needed for discharging and recharging a battery in one hour) even if it is possible to discharge and recharge battery at 1 C (a current allowing discharge and recharge of a battery in one hour); and thus, various attempts, for example those described in the following literatures, were made to improve such a problem.

Japanese Unexamined Patent Publication No. 2001-266850
Japanese Examined Patent Publication No. 7-123053
Japanese Patent No. 1989293
45th Battery Symposium (2004) 3C18

However, the methods described in respective literatures were not sufficiently effective in repair the nonconformity.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

Other objects and advantages of the present invention will be apparent from the following preferred embodiments.

DISCLOSURE OF INVENTION

The present invention has been developed in view of the above-mentioned and/or other problems in the related art. The present invention can significantly improve upon existing methods and/or apparatuses.

Among other potential advantages, some embodiments can provide a current collector for lithium secondary battery permitting quick discharge and recharge and having a higher retention rate of initial battery capacity at a higher rate (at a greater current), and a secondary battery using the same.

After intensive studies to achieve the object, the inventors have found that it was possible to solve the problems above by preparing a lithium-ion secondary battery in the structure in which an ion-permeable compound is in charge of lithium-ion conductivity and electron-conductive carbon fine particles of electron conductivity in particular in its cathode structure, and completed the present invention. Thus, the present invention relates to the followings:

(1) A secondary-battery current collector, comprising an aluminum or copper foil and a film formed thereon containing an ion-permeable compound and carbon fine particles.

(2) A secondary-battery current collector, comprising an aluminum or copper foil and a film formed thereon containing a compound non-swelling in organic solvent and carbon fine particles.

(3) A secondary-battery current collector, comprising an aluminum or copper foil and a film formed thereon containing a compound resistant to exfoliation in a peeling test with organic solvent and carbon fine particles.

(4) A secondary-battery current collector, comprising an aluminum or copper foil and a film formed thereon containing a compound resistant to exfoliation in a tape-peeling test (JIS D0202-1988) and carbon fine particles.

(5) A secondary-battery cathode, comprising an aluminum foil, a film containing an ion-permeable compound and carbon fine particles formed thereon as the lower layer, and a film containing a binder, carbon fine particles and a cathodic electroactive material formed thereon as the upper layer.

(6) A secondary-battery cathode, comprising an aluminum foil, a film containing a compound non-swelling in organic solvent and carbon fine particles formed thereon as the lower layer, and a film containing a binder, carbon fine particles and a cathodic electroactive material formed thereon as the upper layer.

(7) A secondary-battery cathode, comprising an aluminum foil, a film containing a compound resistant to exfoliation in a peeling test with organic solvent and carbon fine particles formed thereon as the lower layer, and a film containing a binder, carbon fine particles and a cathodic electroactive material formed thereon as the upper layer.

(8) A secondary-battery cathode, comprising an aluminum foil, a film containing a compound resistant to exfoliation in a tape-peeling test (JIS D0202-1988) and carbon fine particles formed thereon as the lower layer, and a film containing a binder, carbon fine particles and a cathodic electroactive material formed thereon as the upper layer.

(9) A secondary-battery anode, comprising a copper foil, a film containing an ion-permeable compound and carbon fine particles formed thereon as the lower layer, and a film containing a binder, carbon fine particles and an anodic electroactive material formed thereon as the upper layer.

(10) A secondary-battery anode, comprising a copper foil, a film containing a compound non-swelling in organic solvent and carbon fine particles formed thereon as the lower layer, and a film containing a binder, carbon fine particles and an anodic electroactive material formed thereon as the upper layer.

(11) A secondary-battery anode, comprising a copper foil, a film containing a compound resistant to exfoliation in a peeling test with organic solvent and carbon fine particles formed thereon as the lower layer, and a film containing a binder, carbon fine particles and an anodic electroactive material formed thereon as the upper layer.

(12) A secondary-battery anode, comprising a copper foil, a film containing a compound resistant to exfoliation in a tape-peeling test (JIS D0202-1988) and carbon fine particles formed thereon as the lower layer, and a film containing a binder, carbon fine particles and an anodic electroactive material formed thereon as the upper layer.

(13) A secondary-battery cathode, comprising an aluminum foil and a film containing an ion-permeable compound, carbon fine particles and a cathodic electroactive material formed thereon.

(14) A secondary-battery cathode, comprising an aluminum foil and a film containing a compound non-swelling in organic solvent, carbon fine particles and a cathodic electroactive material formed thereon.

(15) A secondary-battery cathode, comprising an aluminum foil and a film containing a compound resistant to exfoliation in the peeling test with organic solvent, carbon fine particles and a cathodic electroactive material formed thereon.

(16) A secondary-battery cathode, comprising an aluminum foil and a film containing a compound resistant to exfoliation in a tape-peeling test (JIS D0202-1988), carbon fine particles and a cathodic electroactive material formed thereon.

(17) A secondary-battery anode, comprising a copper foil and a film containing an ion-permeable compound, carbon fine particles and an anodic electroactive material formed thereon.

(18) A secondary-battery anode, comprising a copper foil and a film containing a compound non-swelling in organic solvent, carbon fine particles and an anodic electroactive material formed thereon.

(19) A secondary-battery anode, comprising a copper foil and a film containing a compound resistant to exfoliation in the peeling test with organic solvent, carbon fine particles and an anodic electroactive material formed thereon.

(20) A secondary-battery anode, comprising a copper foil and a film containing a compound resistant to exfoliation in a tape-peeling test (JIS D0202-1988), carbon fine particles and an anodic electroactive material.

(21) The secondary-battery current collector as recited in any one of the aforementioned Items (1) to (4), wherein the carbon fine particles are spicular or rod in shape.

(22) The secondary-battery cathode as recited in any one of the aforementioned Items (5) to (8) and (13) to (16), wherein the carbon fine particles are spicular or rod in shape.

(23) The secondary-battery anode as recited in any one of the aforementioned Items (9) to (12) and (17) to (20), wherein the carbon fine particles are spicular or rod in shape.

(24) A method of producing a secondary-battery current collector, comprising forming a film containing an ion-permeable compound and carbon fine particles on an aluminum or copper foil by application.

(25) A method of producing a secondary-battery current collector, comprising forming a film containing a compound non-swelling in organic solvent and carbon fine particles on an aluminum or copper foil by application.

(26) A method of producing a secondary-battery current collector, comprising forming a film containing a compound resistant to exfoliation in a peeling test with organic solvent and carbon fine particles on an aluminum or copper foil by application.

(27) A method of producing a secondary-battery current collector, comprising forming a film containing a compound resistant to exfoliation in a tape-peeling test (JIS D0202-1988) and carbon fine particles on an aluminum or copper foil by application.

(28) A method of producing a secondary-battery cathode, comprising forming a film on an aluminum foil by applying a film containing an ion-permeable compound and carbon fine particles and additionally coating a dispersion of a binder, carbon fine particles and a cathodic electroactive material in a solvent thereon.

(29) A method of producing a secondary-battery cathode, comprising forming a film on aluminum foil by applying a film containing a compound non-swelling in organic solvent and carbon fine particles and additionally coating a dispersion of a binder, carbon fine particles and a cathodic electroactive material in a solvent thereon.

(30) A method of producing a secondary-battery cathode, comprising forming a film on an aluminum foil by applying a film containing a compound resistant to exfoliation in a peeling test with organic solvent and carbon fine particles and additionally coating a dispersion of a binder, carbon fine particles and a cathodic electroactive material in a solvent thereon.

(31) A method of producing a secondary-battery cathode, comprising forming a film on an aluminum foil by applying a film containing a compound resistant to exfoliation in a tape-peeling test (JIS D0202-1988) and carbon fine particles and additionally coating a dispersion of a binder, carbon fine particles and a cathodic electroactive material in a solvent thereon.

(32) A method of producing a secondary-battery anode, comprising forming a film on a copper foil by applying a film containing an ion-permeable compound and carbon fine particles and additionally coating a dispersion of a binder, carbon fine particles and an anodic electroactive material in a solvent thereon.

(33) A method of producing a secondary-battery anode, comprising forming a film on a copper foil by applying a film containing a compound non-swelling in organic solvent and carbon fine particles and additionally coating a dispersion of a binder, carbon fine particles and an anodic electroactive material in a solvent thereon.

(34) A method of producing a secondary-battery anode, comprising forming a film on a copper foil by applying a film containing a compound resistant to exfoliation in a peeling test with organic solvent and carbon fine particles and additionally coating a dispersion of a binder, carbon fine particles and an anodic electroactive material in a solvent thereon.

(35) A method of producing a secondary-battery anode, comprising forming a film on a copper foil by applying a film containing a compound resistant to exfoliation in a tape-peeling test (JIS D0202-1988) and carbon fine particles and additionally coating a dispersion of a binder, carbon fine particles and an anodic electroactive material in a solvent thereon.

(36) A method of producing a secondary-battery cathode, comprising forming a film on an aluminum foil by coating and drying a dispersion of an ion-permeable compound, carbon fine particles and a cathodic electroactive material in a solvent thereon.

(37) A method of producing a secondary-battery cathode, comprising forming a film on an aluminum foil by coating and drying a dispersion of a compound non-swelling in organic solvent, carbon fine particles and a cathodic electroactive material in a solvent thereon.

(38) A method of producing a secondary-battery cathode, comprising forming a film on an aluminum foil by coating and drying a dispersion of a compound resistant to exfoliation in the peeling test with organic solvent, carbon fine particles and a cathodic electroactive material in a solvent thereon.

(39) A method of producing a secondary-battery cathode, comprising forming a film on an aluminum foil by coating and drying a dispersion of a compound resistant to exfoliation in the tape-peeling test (JIS D0202-1988), carbon fine particles and a cathodic electroactive material in a solvent thereon.

(40) A method of producing a secondary-battery anode, comprising forming a film on a copper foil by coating and drying a dispersion of an ion-permeable compound, carbon fine particles and an anodic electroactive material in a solvent thereon.

(41) A method of producing a secondary-battery anode, comprising forming a film on a copper foil by coating and drying a dispersion of a compound non-swelling in organic solvent, carbon fine particles and an anodic electroactive material in a solvent thereon.

(42) A method of producing a secondary-battery anode, comprising forming a film on a copper foil by coating and drying a dispersion of a compound resistant to exfoliation in the peeling test with organic solvent, carbon fine particles and an anodic electroactive material in a solvent thereon.

(43) A method of producing a secondary-battery anode, comprising forming a film on a copper foil by coating and drying a dispersion of a compound resistant to exfoliation in a tape-peeling test (JIS D0202-1988), carbon fine particles and anodic electroactive material in a solvent thereon.

(44) A method of producing a secondary batter, comprising impregnating a layer which comprises a cathode, a separator and an anode piled up in that order with an organic electrolyte solution, wherein the cathode used is the cathode as recited in any one of the aforementioned Items (5) to (8) and (13) to (16).

(45) A secondary battery comprising a layer which comprises a cathode, a separator and an anode piled up in that order and is impregnated with an organic electrolyte solution, wherein the cathode used is the cathode as recited in any one of the aforementioned Items (5) to (8) and (13) to (16).

(46) A method of producing a secondary battery, comprising impregnating a layer which comprises a cathode, a separator and an anode pile up in that order with an organic electrolyte solution, wherein the anode used is the anode as recited in any one of the aforementioned Items (9) to (12) and (17) to (20).

(47) A secondary battery comprising a layer which comprises a cathode, a separator and an anode piled up in that order and is impregnated with an organic electrolyte solution, wherein the anode used is the anode as recited in any one of the aforementioned Items (9) to (12) and (17) to (20).

(48) The secondary-battery cathode as recited in any one of the aforementioned Items (5) to (8) and (13) to (16), wherein the cathodic electroactive material contains any one or more of lithium cobaltate ($LiCoO_2$), lithium manganate ($LiMn_2O_4$), lithium nickelate ($LiNiO_2$), ternary lithium compounds of Co, Mn, and Ni [$Li(Co_xMn_yNi_z)O_2$], sulfur compounds ($TiS_2$), and olivine compounds ($LiFePO_4$, $LiMnPO_4$).

(49) The method of producing a secondary-battery cathode as recited in any one of the aforementioned Items (28) to (31) and (36) to (39), wherein the cathodic electroactive material contains any one or more of lithium cobaltate ($LiCoO_2$), lithium manganate ($LiMn_2O_4$), lithium nickelate ($LiNiO_2$), ternary lithium compounds of Co, Mn, and Ni [$Li(Co_xMn_yNi_z)O_2$], sulfur compounds ($TiS_2$), and olivine compounds ($LiFePO_4$, $LiMnPO_4$).

(50) The secondary battery as recited in the aforementioned Item (45) or (47), wherein the cathodic electroactive material contains any one or more of lithium cobaltate ($LiCoO_2$), lithium manganate ($LiMn_2O_4$), lithium nickelate ($LiNiO_2$), ternary lithium compounds of Co, Mn, and Ni [$Li(Co_xMn_yNi_z)O_2$], sulfur compounds ($TiS_2$), and olivine compounds ($LiFePO_4$, $LiMnPO_4$).

(51) The secondary battery as recited in the aforementioned Item (45) or (47), wherein the anodic electroactive material contains graphite.

(52) The secondary-battery current collector as recited in anyone of the aforementioned Items (1) to (4), wherein the compound is a crosslinked polysaccharide polymer.

(53) The method of producing a secondary-battery current collector as recited in any one of the aforementioned Items (24) to (27), wherein the compound is a crosslinked polysaccharide polymer.

(54) The secondary battery as recited in the aforementioned Item (45) or (47), wherein the compound is a crosslinked polysaccharide polymer.

(55) The secondary battery as recited in the aforementioned Item (54), wherein the compound is a crosslinked compound of a polysaccharide polymer crosslinked with any one of acrylamide, acrylonitrile, chitosan pyrrolidone carboxylate salts, hydroxypropylchitosan, and acid anhydrides such as phthalic anhydride, maleic anhydride, trimellitic anhydride, and pyromellitic anhydride.

(56) The secondary battery as recited in the aforementioned Item (45) or (47), wherein the lithium- or fluorine-ion conductivity of the compound is $1\times10^{-2}$ S/cm or more.

(57) The secondary-battery current collector as recited in any one of the aforementioned Items (1) to (4), wherein the number average molecular weight of the compound is 50,000 or less.

(58) The secondary-battery as recited in the aforementioned Item (45) or (47), wherein the number average molecular weight of the compound is 50,000 or less.

(59) A vehicle and an electric power tool, carrying the secondary battery as recited in any one of the aforementioned Items (45), (47), (50), (51), (54) to (56) and (58).

Effects of the Invention

The secondary-battery current collector, cathode, anode, and secondary battery according to the present invention, and the secondary-battery current collector, cathode, anode, and secondary battery produced by the production method thereof according to the present invention are drastically improved in the retention rate from initial capacity at high rate, and can be used favorably in or as a secondary battery superior in quick discharge/recharge characteristics.

BRIEF DESCRIPTION OF THE DRAWINGS

The preferred embodiments of the present invention are shown by way of example, and not limitation, in the accompanying figures, in which.

BEST MODE FOR CARRYING OUT THE INVENTION

Figure 1:
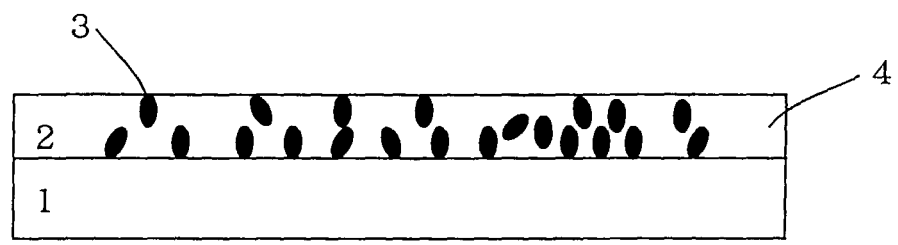
FIG. 1 is a schematic view illustrating the cross-sectional structure illustrating the lower layer of the current-collector in Example 1 of the present invention.
Figure 2:
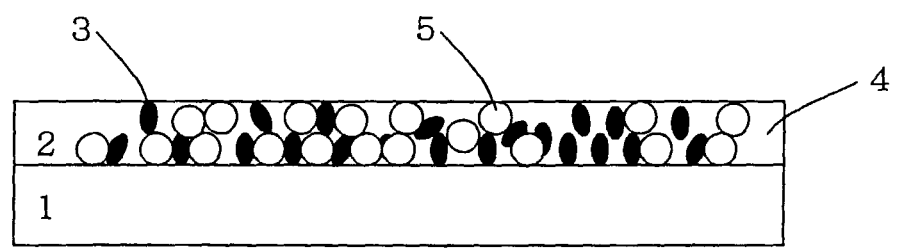
FIG. 2 is a schematic view illustrating the cross-sectional structure of the cathode in Example 2 of the present invention.

In the following paragraphs, some preferred embodiments of the invention will be described by way of example and not limitation. It should be understood based on this disclosure that various other modifications can be made by those in the art based on these illustrated embodiments. In the present specification, aluminum means aluminum or an aluminum alloy, and copper means pure copper or a copper alloy.

The aluminum foil for use in the present invention is not particularly limited, and various kinds of aluminum including pure aluminums such as A1085 and A3003 may be used. The thickness is preferably, approximately 5 to 100 μm. The copper foil is also similar, and a rolled copper foil or an electrolytic copper foil is used favorably. In the present invention, the aluminum foil is used as a part of cathode, while the copper foil as a part of anode.

An aluminum or copper-foil thickness of 5 μm or less is undesirable, because it may results in foil breakage in the coating step of forming a current-collecting layer because of insufficiency in strength, while a thickness of more than 100 μm is also unfavorable, as it results in deterioration in battery capacity due to increase in the rate of the foil in a particular volume of the battery.

The cathodic electroactive material for use in the present invention is not particularly limited, if it is a material adsorbing and releasing lithium (ions). Typical examples thereof include lithium cobaltate ($LiCoO_2$), lithium manganate ($LiMn_2O_4$), lithium nickelate ($LiNiO_2$), ternary lithium compounds of Co, Mn, and Ni [$Li(Co_xMn_yNi_z)O_2$], sulfur compounds ($TiS_2$), olivine compounds ($LiFePO_4$, $LiMnPO_4$), and the like.

The particle diameter of these cathodic electroactive materials is preferably 1 to 50 μm. A particle diameter of 50 μm or more is undesirable, as it leads to inconsistency in adsorption and release of lithium between inside and outside the particles. On the other hand, a diameter of 1 μm or less is also undesirable, as it results in deterioration in crystallinity, irregularity in its particle structure, and consequently, deterioration in performance.

Any one of known materials may be used as the anodic electroactive material for anode. The anodic material is not particularly limited and examples thereof include graphite-based materials such as graphite, amorphous graphite materials, and oxide materials.

Examples of the ion-permeable compounds for use in the present invention include compounds non-swelling in organic solvent, compounds resistant to exfoliation in a peeling test with organic solvent, compounds resistant to exfoliation in a tape-peeling test (hereinafter, all these compounds will be referred to as film-forming compounds), and typical examples thereof are shown below:

The ion-permeable compound is not particularly limited, if it is a material allowing permeation of ions (including compounds), and examples thereof include crosslinked polymers of cellulose and acrylamide, crosslinked polymers of cellulose and a chitosan pyrrolidone carboxylate salt, and the like. Other examples include crosslinked polymers of a polysaccharide polymer such as chitosan or chitin crosslinked with a crosslinking agent, and the like. Examples of the crosslinking agents for use include acrylamide, acrylonitrile, chitosan pyrrolidone carboxylate salt, hydroxypropylchitosan, and acid anhydrides such as phthalic anhydride, maleic anhydride, trimellitic anhydride, and pyromellitic anhydride, and the like.

The ion conductivity thereof is preferably higher, from the viewpoint of battery performance. The lithium-ion conductivity is preferably higher, and a compound having a lithium-ion conductivity of $1\times10^{-2}$ S/cm or more is preferable. Also favorable is a compound having a fluorine-ion conductivity of $1\times10^{-2}$ S/cm or more.

The film-forming compound is preferably one of the compounds above that is resistant to organic solvent and adheres to the metal foil tightly, because the formed film is dissolved in the organic electrolyte solution that is normally used as the electrolyte solution in lithium-ion battery.

Polyamide, polyamide-imide and the like, which are known as the compounds resistant to organic solvent, are generally, very expensive and not practical. In addition, these polymers have a smaller average molecular weight at approximately 50,000, and are not sufficiently adhesive to metal foil. On the other hand, there are polymers having an average molecular weight of 50,000 or more such as the PVDF, PTFE, and others described above, and these polymers are sufficiently adhesive to the metal foil but not resistant to organic solvent as, they swell in the organic solvent. Accordingly, desirable is a polymer having an average molecular weight of 50,000 or less, higher in adhesiveness to the metal foil, and particularly higher in the resistance to organic solvent.

These properties can be determined by using a swelling test in solvent, a peeling test by using a cloth previously immersed in a solvent (abrasion test), and a tape-peeling test (JIS D0202-1988).

Examples of the materials showing the properties above include derivatives of polysaccharide polymers crosslinked with an acrylic additive or an acid anhydride, materials derived from chitosan derivatives, and the like.

The electron-conductive carbon fine particles for use in the present invention are not particularly limited, but favorable are fine particles of acetylene black and Ketjen black, gas-phase carbon fiber, graphite fine particles, and the like. In particular, carbon fine particles having an electric resistance as powder of $1 \times 10^{-1}$ $\Omega \cdot$cm or less in 100% green compact are preferable, and the particles described above may be used in combination as needed.

The particle size of the electron-conductive carbon fine particles is not particularly limited, but preferably, approximately 10 to 100 nm. The shape thereof is preferably non-spherical, and carbon particles having an anisotropic shape, spicular or rod in shape, are more preferable. The reasons are as follows: Electron-conductive carbon fine particles are partially in charge of the conduction of electrons in lithium-ion secondary battery. The contact area between the aluminum foil and the cathodic electroactive material is preferably larger during charge, because the electrons supplied from outside should be conducted via the aluminum foil to the cathodic electroactive material. Accordingly, fine particles having a greater surface area per weight are advantageous. In addition, it is necessary to use the fine particles in an amount as small as possible for preservation of its battery capacity. For that reason, use of electron-conductive carbon fine particles having an anisotropic shape is desirable.

In the present invention, the method of preparing the film containing a film-forming compound and carbon fine particles is not particularly limited, and any one of known methods may be used. Typical examples thereof include casting, bar-coater coating, dip coating, printing, and the like. Among these methods, bar-coater coating, casting, and the like are preferable for better control of film thickness. A current collector (for cathode or anode) is prepared by forming a carbon fine particles-containing film on an aluminum or copper foil. The thickness thereof is preferably 0.1 µm or more and 10 µm or less. A thickness of 0.1 µm or less prohibits desirable effects and is thus, undesirable. On the other hand, a thickness of 10 µm or more is also undesirable, as it leads to relative drop of the ratio of the electroactive material in a particular volume of the secondary battery.

A film containing a cathodic or anodic electroactive material can also be prepared in a similar process. The film thickness is preferably 10 µm or more and 500 µm or less. A film thickness of 10 µm or less leads to drop of the rate of the electroactive material in a particular volume of battery and deterioration in battery capacity, and is thus, undesirable. On the other hand, a thickness of 500 µm or more is also undesirable, as it leads to exfoliation of the film from the foil and increase in the internal resistance of the battery.

Hereinafter, the method of forming a film containing a cathodic electroactive material will be described in more detail. A film containing an anodic electroactive material can also be prepared similarly to the film above, by replacing the aluminum foil and the cathodic electroactive material in the description below respectively with a copper foil and an anodic electroactive material.

The composition of the film is adjusted in the step of forming a paste for the film. Specifically, the paste is prepared by mixing a film-forming compound, a carbon compound, a cathodic electroactive material, and others in a kneader and adding a solvent for viscosity adjustment additionally. Because the solvent is removed by vaporization in the downstream step, only solid matters (film-forming compound, carbon fine particles, and cathodic active material) remain in the film. The contents of these ingredients, film-forming compound, carbon fine particles, and cathodic active material, are preferably, respectively 1 to 30 wt %, 1 to 30 wt %, and 65 wt % or more.

The thickness of the film is preferably 0.1 µm or more and 500 µm or less. A thickness of 0.1 µm or less prohibits desirable effects. On the other hand, a thickness of 500 µm or more results in cracking of the film and exfoliation thereof from the aluminum foil and is thus, unfavorable.

The current collector according to the present invention may have two films, upper and lower layers, on the aluminum foil. A film containing a film-forming compound and carbon fine particles is then formed as the lower layer, while a film containing a binder, carbon fine particles and a cathodic electroactive material as the upper layer. The binder contained in the upper layer is not particularly limited, if it can immobilize the particles, and may additionally contain a film-forming compound such as a polysaccharide polymer crosslinked with an acrylic additive or a commonly-used compound, for example polyvinylidene fluoride (PVDF) or polytetrafluoroethylene (PTFE).

Evaluation of the performance of the secondary-battery current collector according to the present invention as battery can performed by preparing an electrode with the current collector and forming a secondary battery together with a known separator and organic electrolyte solution.

Alternatively, the performance of the secondary battery according to the present invention can be evaluated, as it is installed in a vehicle (such as automobile or bicycle) or an electric power tool (e.g., electric drill, impact wrench, or the like).

EXAMPLES

Hereinafter, the present invention will be described specifically with reference to Examples and Comparative Examples, but it should be understood that the present invention is not restricted by the following Examples.

Example 1

An A1085 aluminum foil 1 having a thickness of 30 µm was made available. Then, a polysaccharide polymer chitosan crosslinked with pyromellitic anhydride was made prepared as an ion-permeable compound 4. The molecular weight thereof was 35,000, as determined by GPC. A mixed paste containing electron-conductive carbon fine particles 3 (acetylene black, particle diameter: 40 nm), the crosslinked chitosan above, and a solvent was prepared. The solvent used was water, and the weight ratio of ion-permeable compound 4: carbon fine particle 3: water was 35:15:50. Then, the paste was applied on the aluminum foil 1 by casting by using an applicator (opening: 10 µm) and then, dried in air at 180° C. for 3 minutes and thermally hardened, to give an aluminum foil 1 having a film 2 containing the ion-permeable compound 4 and the carbon fine particles 3.

The thickness of the film 2, as determined after drying, was 5 µm, and the content of the electron-conductive carbon fine particles 3 in the film 2 was 30 wt %.

An electrode layer having a thickness of 200 µm was then formed by using a cathode paste consisting of a cathodic electroactive material, electron-conductive carbon fine particles, a binder, and a solvent, to give a lithium ion secondary-battery cathode. The cathodic electroactive material used then was lithium cobaltate; the conductive carbon fine particles, acetylene black; the binder, polyvinylidene fluoride (PVDF); and the solvent, N-methyl-2-pyrrolidone (NMP). The composition of respective components, cathodic electroactive material: carbon fine particle: binder, was 95:2:3 (weight ratio), and the solvent was used in an amount of 10 wt % with respect to the cathodic electroactive material by weight.

Further, a separatfor and an anode formed on a copper foil were connected, and the composite was impregnated with an organic electrolyte solution, to give a lithium-ion secondary battery.

The cycle characteristics of the lithium-ion secondary battery thus obtained were determined. Results are summarized in Table 1. The analyzer used was a battery charge/discharge apparatus HJ-2010 manufactured by Hokuto Denko Corporation and the retention rates from initial capacity after 100 cycles at varying current rates of 0.1 C, 2 C, and 20 C were shown by percentage. As apparent from the Table, use of the current collector according to the present invention resulted in significant improvement in the retention rate from initial capacity especially at the higher rates, although there was no significant difference at the lower current rate, indicating that the current collector are superior in quick-recharge characteristics.

The internal resistance of the secondary batteries was also determined. It was determined by an AC impedance method by using a battery tester HIOKI3551 at a test frequency of 1 kHz. The results are summarized in Table 2. A smaller measured value indicates better quick-recharge characteristics.

Example 2

An A1085 aluminum foil 1 having a thickness of 30 μm was made available. Additionally, a polysaccharide polymer chitin crosslinked with maleic anhydride was prepared as an ion-permeable compound 4. The molecular weight thereof was 30,000, as determined by GPC. A mixed paste containing electron-conductive carbon fine particles 3 (acetylene black, particle diameter: 40 nm), the crosslinked chitin above, a cathodic electroactive material lithium manganate ($LiMn_2O_4$) and a solvent (NMP) was prepared. The contents of the ion-permeable compound 4, carbon fine particles 3, and cathodic electroactive material 5 in the paste were respectively, 2 wt %, 3 wt %, and 95 wt %; and the solvent was used in an amount of 10 wt % with respect to the cathodic electroactive material 5. Then, the paste was applied on the aluminum foil 1 in a similar manner to Example 1 by using an applicator (opening: 250 μm) and then, dried in air at 180° C. for 3 minutes and thermally hardened, to give an aluminum foil 1 having a film 2 containing the ion-permeable compound 4 and the carbon fine particles 3 and cathodic electroactive material 5.

The thickness of the film 2, as determined after drying, was 200 μm; and the contents of the electron-conductive carbon fine particles 3 and the cathodic electroactive material 5 in the film 2 were respectively 3 wt % and 95 wt %.

A lithium-ion secondary battery was then prepared by connecting a separator and an anode current collector formed on a copper foil and impregnating the composite with an organic electrolyte solution in the step, in a similar manner to Example 1.

The retention rate from initial capacity and the internal resistance thereof were determined similarly, and the results are summarized in Tables 1 and 2.

Example 3

In Example 3, the aluminum foil material A1085 used in Example 2 was replaced with an aluminum foil A3003, and a compound resistant to exfoliation in a peeling test with organic solvent, i.e., a polysaccharide polymer chitosan crosslinked with acrylonitrile, was made available as the ion-permeable compound. When the compound is filmed to a thickness of 0.5 μm and the film was subjected to the peeling test by using an organic solvent, ethanol, there was no exfoliation observed. The molecular weight thereof was 31,000, as determined by GPC. The carbon fine particles used were gas-phase carbon fiber (registered trade name: VGCF, manufactured by Showa Denko). In addition, the cathodic electroactive material was replaced with an olivine compound ($LiFePO_4$). The amount of carbon fine particles added was also changed; and the contents of the compound resistant to exfoliation in a peeling test with organic solvent, carbon fine particles, and a cathodic electroactive material in the paste were respectively, 2 wt %, 1 wt %, and 97 wt %.

A lithium-ion secondary battery was prepared in a similar manner to Example 2, except the modifications above. The retention rate from initial capacity and the internal resistance thereof were determined similarly, and the results are summarized in Table 1.

Example 4

In Example 4, the ion-permeable compound used in Example 1 was replaced with a compound non-swelling in NMP, a polysaccharide polymer chitosan crosslinked with trimellitic anhydride, and NMP was used as the solvent. The molecular weight of the compound was 22,000, as determined by GPC.

A lithium-ion secondary battery was prepared in a similar manner to Example 1, except the modifications above. The retention rate from initial capacity and the internal resistance thereof were determined similarly, and the results are summarized in Tables 1 and 2.

Example 5

An electrolytic copper foil having a thickness of 9 μm was made available. Then, a polysaccharide polymer cellulose crosslinked with a chitosan pyrrolidone carboxylate salt was made prepared as the ion-permeable compound. The molecular weight thereof was 40,000, as determined by GPC. A mixed paste containing the cellulose and electron-conductive carbon fine particles (acetylene black, particle diameter: 40 nm) was prepared. The solvent used was NMP, and the weight ratio of ion-permeable compound: carbon fine particles: solvent was 35:15:50. Then, the paste was applied on a copper foil by a gravure method by using a gravure roll (#200) and then, dried in air at 180° C. for 3 minutes and thermally hardened, to give a copper foil (current collector) having a film containing the ion-permeable compound and the carbon fine particles.

The thickness of the film, as determined after drying, was 0.2 μm, and the content of the electron-conductive carbon fine particles in the film was 30 wt %.

Then, an electrode layer having a thickness of 250 μm was formed by using an anode paste containing an anodic electroactive material, electron-conductive carbon fine particles, a binder, and a solvent, to make a lithium ion secondary-battery anode. The anodic electroactive material used then was graphite; the conductive carbon fine particles, acetylene black; the binder, polyvinylidene fluoride (PVDF); and the solvent, N-methyl-2-pyrrolidone (NMP). The ratio of respective components, anodic electroactive material: carbon fine particle: binder, was 92:5:3 (weight ratio), and the solvent was used in an amount of 10 wt % with respect to the weight of the anodic electroactive material.

A lithium-ion secondary battery was then prepared in the step similar to Example 1, by connecting the separator and the cathode formed on aluminum foil used in Example 1 and impregnating the composite with the organic electrolyte solution. The retention rate from initial capacity and the internal resistance thereof were determined similarly, and the results are summarized in Tables 1 and 2.

Example 6

A compound resistant to exfoliation in a tape-peeling test, a polysaccharide polymer chitosan crosslinked with acrylonitrile, was prepared as the replacement for the ion-permeable compound used in Example 5. The compound was filmed to a thickness of 0.5 μm and subjected to the tape-peeling test, and no exfoliation was observed in 100 cases out of 100 tests. The molecular weight thereof was 26,000, as determined by GPC. The carbon fine particles used were gas-phase carbon fiber (registered trade name: VGCF, manufactured by Showa Denko). A lithium-ion secondary battery was prepared in a similar manner to Example 5, except the modifications above. The retention rate from initial capacity and the internal resistance were determined similarly, and the results are summarized in Tables 1 and 2.

Comparative Example 1

A cathode current collector was prepared in a similar manner to Example 1, except that the composite film containing an ion-permeable compound and electron-conductive carbon fine particles formed on the A1085 aluminum foil was replaced with a current-collecting layer of 200 μm in thickness containing the cathodic electroactive material (lithium cobaltate) shown in Example 1, electron-conductive carbon fine particles (acetylene black), a binder (PVDF), and a solvent (NMP). A lithium-ion secondary battery was then prepared similarly, and the retention rate from initial capacity and the internal resistance thereof were determined under the conditions similar to those in Example 1, and the results are summarized in Tables 1 and 2.

Comparative Example 2

A lithium-ion secondary battery was prepared in a similar manner to Example 1, except that the ion-permeable compound used in Example 5 was replaced with the PVDF binder above (compound resistant to exfoliation in the organic-solvent peeling test), and the retention rate from initial capacity and the internal resistance were determined under the conditions similar to those in Example 1, and the results are summarized in Tables 1 and 2. Although it was possible to prepare a secondary battery, the current collector having a film containing carbon fine particles after preparation resulted in significant exfoliation when the surface of the current collector is rubbed with an NMP-impregnated cloth, suggesting that the secondary battery would not withstand use for an extended period of time even if it had favorable initial characteristics.

Comparative Example 3

A lithium-ion secondary battery was prepared in a similar manner to Example 1, except that the ion-permeable compound used in Example 1 was replaced with a PVA (polyvinyl alcohol) binder (compound vulnerable to exfoliation in tape-peeling test), and the retention rate from initial capacity and the internal resistance were determined under the conditions similar to those in Example 1, and the results are summarized in Tables 1 and 2. Although it was possible to prepare a secondary battery, the current collector having a film containing carbon fine particles after preparation resulted in significant exfoliation of the current collector surface when it is subjected to the tape-peeling test, suggesting that the secondary battery would not withstand use for an extended period of time even if it had favorable initial characteristics.

Table 1 reveals that the secondary batteries in Comparative Examples are not lower in the retention rate from initial capacity at lower rate, but significantly lower in the retention rate from initial capacity at higher rate than those in Examples according to the present invention Examples, suggesting that secondary batteries are more difficult to discharge and recharge rapidly.

Table 2 also reveals that the secondary batteries in Examples are lower in internal resistance and suitable for quick discharge and recharge.

The quick discharge and recharge characteristics of the secondary batteries according to the present invention seems to be the result of tighter bonding among the metal foil, carbon fine particles-containing film, and electrode film, because the ion-permeable binder and the electron-conductive carbon fine particles are separately in charge of conduction of ions and electrons.

TABLE 1

| Example/Comparative Example | 0.1 C | 2 C | 20 C |
| --- | --- | --- | --- |
| Example 1 | 98% | 80% | 60% |
| Example 2 | 98% | 85% | 70% |
| Example 3 | 98% | 80% | 65% |
| Example 4 | 98% | 85% | 70% |
| Example 5 | 98% | 85% | 70% |
| Example 6 | 98% | 80% | 65% |
| Comparative Example 1 | 98% | 70% | 30% |
| Comparative Example 2 | 97% | 60% | 20% |
| Comparative Example 3 | 96% | 50% | 10% |

TABLE 2

| Example/Comparative Example | Internal resistance |
| --- | --- |
| Example 1 | 5 mΩ |
| Example 2 | 8 mΩ |
| Example 3 | 6 mΩ |
| Example 4 | 4 mΩ |
| Example 5 | 4 mΩ |
| Example 6 | 7 mΩ |
| Comparative Example 1 | 15 mΩ |
| Comparative Example 2 | 25 mΩ |
| Comparative Example 3 | 20 mΩ |

Industrial Applicability

The present invention provides a secondary-battery current collector, a method of producing a secondary-battery current collector, and a secondary battery having the current collector. In particular, the secondary-battery current collector comprising an aluminum foil and a film containing an ion-permeable compound and carbon fine particles formed thereon and the relevant inventions, which allows drastic improvement in the retention rate from initial capacity at high rate when a secondary battery is formed and is superior in quick discharge/recharge characteristics, can be used favorably in devices carrying a secondary battery such as communication devices and digital electronics devices. Such characteristics of the secondary-battery current collector and others according to the invention expand application of the devices carrying a secondary battery and the range of industrial applications thereof.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example;" and "NB" which means "note well."

The invention claimed is:

1. A secondary-battery cathode comprising:
a current collector comprising a foil and a conductive film adhered on a surface of the foil; and
a cathodic electroactive film adhered on a surface of the conductive film of the current collector and comprising a binder, carbon fine particles and a cathodic electroactive material,
wherein the foil comprises one of aluminum and copper and has a thickness which is in a range of more than 5 µm and 100 µm or less, the conductive film has a thickness which is in a range of 0.1 µm or more and 10 µm or less, the conductive film comprises an ion-permeable compound and carbon fine articles, the ion-permeable compound comprises a cross-linked polysaccharide which is a polysaccharide polymer cross-linked with a cross-linking agent, the conductive film is formed to electrically connect the foil and a cathodic electroactive film in a secondary battery and has the carbon fine particles in an amount sufficient to provide conduction of electrons in the conductive film positioned between the foil and the cathodic electroactive film in the secondary battery, and the carbon fine particles have particle sizes in a range of 10 nm to 100 nm, wherein the cross-linking agent comprises at least one selected from the group consisting of acrylamide, acrylonitrile, chitosan pyrrolidone carboxylate salt, hydroxypropylchitosan, phthalic anhydride, maleic anhydride, trimellitic anhydride, and pyromellitic anhydride.

2. A secondary-battery anode comprising:
a current collector comprising a foil and a conductive film adhered on a surface of the foil; and
an anodic electroactive film adhered on a surface of the conductive film of the current collector and comprising a binder, carbon fine particles and an anodic electroactive material,
wherein the foil comprises one of aluminum and copper and has a thickness which is in a range of more than 5 µm and 100 µm or less, the conductive film has a thickness which is in a range of 0.1 µm or more and 10 µm or less, the conductive film comprises an ion-permeable compound and carbon fine particles, the ion-permeable compound comprises a cross-linked polysaccharide which is a polysaccharide polymer cross-linked with a cross-linking agent, the conductive film is formed to electrically connect the foil and an anodic electroactive film in a secondary battery and has the carbon fine particles in an amount sufficient to provide conduction of electrons in the conductive film positioned between the foil and the anodic electroactive film in the secondary battery, and the carbon fine particles have particle sizes in a range of 10 nm to 100 nm, wherein the cross-linking agent comprises at least one selected from the group consisting of acrylamide, acrylonitrile, chitosan pyrrolidone carboxylate salt, hydroxypropylchitosan, phthalic anhydride, maleic anhydride, trimellitic anhydride, and pyromellitic anhydride.

3. A method of producing a secondary-battery cathode, comprising:
forming a current collector comprising a foil and a conductive film adhered on a surface of the foil; and
coating a dispersion of a binder, carbon fine particles and a cathodic electroactive material in a solvent on a surface of the conductive film of the current collector such that a cathodic electroactive film comprising the binder, carbon fine particles and cathodic electroactive material is adhered on the surface of the conductive film,
wherein the foil comprises one of aluminum and copper and has a thickness which is in a range of more than 5 µm and 100 µm or less, the conductive film has a thickness which is in a range of 0.1 µm or more and 10 µm or less, the conductive film comprises an ion-permeable compound and carbon fine particles, the ion-permeable compound comprises a cross-linked polysaccharide which is a polysaccharide polymer cross-linked with a cross-linking agent, the conductive film is formed to electrically connect the foil and a cathodic electroactive film in a secondary battery and has the carbon fine particles in an amount sufficient to provide conduction of electrons in the conductive film positioned between the foil and the cathodic electroactive film in the secondary battery, and the carbon fine particles have particle sizes in a range of 10 nm to 100 nm, wherein the cross-linking agent comprises at least one selected from the group consisting of acrylamide, acrylonitrile, chitosan pyrrolidone carboxylate salt, hydroxypropylchitosan, phthalic anhydride, maleic anhydride, trimellitic anhydride, and pyromellitic anhydride.

4. A method of producing a secondary-battery anode, comprising:
    forming a current collector comprising a foil and a conductive film adhered on a surface of the foil; and
    coating a dispersion of a binder, carbon fine particles and an anodic electroactive material in a solvent on a surface of the conductive film of the current collector such that an anodic electroactive film comprising the binder, carbon fine particles and anodic electroactive material is adhered on the surface of the conductive film,
    wherein the foil comprises one of aluminum and copper and has a thickness which is in a range of more than 5 µm and 100 µm or less, the conductive film has a thickness which is in a range of 0.1 µm or more and 10 µm or less, the conductive film comprises an ion-permeable compound and carbon fine articles the ion-permeable compound comprises a cross-linked polysaccharide which is a polysaccharide polymer cross-linked with a cross-linking agent, the conductive film is formed to electrically connect the foil and an anodic electroactive film in a secondary battery and has the carbon fine particles in an amount sufficient to provide conduction of electrons in the conductive film positioned between the foil and the anodic electroactive film in the secondary battery, and the carbon fine particles have particle sizes in a range of 10 nm to 100 nm, wherein the cross-linking agent comprises at least one selected from the group consisting of acrylamide, acrylonitrile, chitosan pyrrolidone carboxylate salt, hydroxypropylchitosan, phthalic anhydride, maleic anhydride, trimellitic anhydride, and pyromellitic anhydride.

5. A method of producing a secondary battery, comprising:
    impregnating a layer which comprises the cathode as recited in claim 1, a separator formed on the cathode and an anode formed on the separator with an organic electrolyte solution.

6. A secondary battery comprising:
    a layer which comprises the cathode as recited in claim 1, a separator formed on the cathode and an anode formed on the separator,
    wherein the layer is impregnated with an organic electrolyte solution.

7. A method of producing a secondary battery, comprising:
    impregnating a layer which comprises a cathode, a separator formed on the cathode and the anode as recited in claim 2 formed on the separator with an organic electrolyte solution.

8. A secondary battery comprising:
    a layer which comprises a cathode, a separator formed on the cathode, and the anode as recited in claim 2 formed on the separator,
    wherein the layer is impregnated with an organic electrolyte solution.

* * * * *